(12) United States Patent
Adlhoch et al.

(10) Patent No.: US 10,377,248 B2
(45) Date of Patent: Aug. 13, 2019

(54) CHARGING DEVICE

(71) Applicant: Siemens Aktiengesellschaft, Munich (DE)

(72) Inventors: Manfred Adlhoch, Bernhardswald (DE); Florian Festl, Regensburg (DE); Thomas Fuchs, Regensburg (DE); Alexander Mundry, Hengersberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 127 days.

(21) Appl. No.: 15/624,856

(22) Filed: Jun. 16, 2017

(65) Prior Publication Data
US 2017/0368951 A1  Dec. 28, 2017

(30) Foreign Application Priority Data
Jun. 24, 2016 (DE) .......... 10 2016 211 387

(51) Int. Cl.
| | |
|---|---|
| *B60L 11/18* | (2006.01) |
| *H02J 7/00* | (2006.01) |
| *B60L 53/00* | (2019.01) |
| *B60L 53/66* | (2019.01) |
| *H02J 7/34* | (2006.01) |

(52) U.S. Cl.
CPC ........... *B60L 11/1809* (2013.01); *B60L 53/00* (2019.02); *B60L 53/665* (2019.02); *H02J 7/0063* (2013.01); *H02J 7/0029* (2013.01); *H02J 7/345* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC combination set(s) only.
See application file for complete search history.

(56) References Cited

U.S. PATENT DOCUMENTS

| | | | |
|---|---|---|---|
| 4,656,412 A * | 4/1987 | McLyman | H02J 7/025 320/139 |
| 2011/0037317 A1 * | 2/2011 | Kuschnarew | B60L 3/0061 307/9.1 |

(Continued)

FOREIGN PATENT DOCUMENTS

| | | |
|---|---|---|
| DE | 102013205236 A1 | 4/2014 |
| DE | 102014003832 A1 | 9/2014 |

OTHER PUBLICATIONS

German Office Action dated May 29, 2017.

*Primary Examiner* — Adam D Houston
(74) *Attorney, Agent, or Firm* — Harness, Dickey & Pierce, P.L.C.

(57) ABSTRACT

An embodiment of the invention relates to a charging device for charging an at least partially electrically operated vehicle. The charging device is formed with at least one electrical component and a switching device. The at least one electrical component and the switching device are arranged in the charging device in such a way that when the charging device is connected to a vehicle a circuit is produced for assisting the discharging of at least one capacitor provided on the vehicle side, the capacitor being openable or closable via the switching device.

22 Claims, 9 Drawing Sheets

(56) References Cited

U.S. PATENT DOCUMENTS

| | | | |
|---|---|---|---|
| 2011/0181123 A1* | 7/2011 | Ichikawa | B60L 53/60 307/104 |
| 2011/0320056 A1* | 12/2011 | Brown | B60L 3/0069 700/295 |
| 2012/0119702 A1* | 5/2012 | Gaul | B60L 3/0069 320/109 |
| 2013/0015814 A1* | 1/2013 | Kelty | B60L 3/0046 320/109 |
| 2013/0257446 A1* | 10/2013 | Soell | G01R 31/006 324/503 |
| 2013/0285581 A1* | 10/2013 | Meyer, III | H02J 7/0031 318/139 |
| 2014/0015316 A1* | 1/2014 | Schoenknecht | B60L 3/04 307/10.1 |
| 2014/0015329 A1* | 1/2014 | Widmer | G01D 5/2006 307/104 |
| 2014/0015492 A1* | 1/2014 | Namou | H01M 10/44 320/136 |
| 2014/0266044 A1 | 9/2014 | Kang et al. | |
| 2014/0285209 A1* | 9/2014 | Stichowski | G01R 31/006 324/503 |
| 2016/0089988 A1* | 3/2016 | Bartz | B60L 11/182 320/108 |
| 2016/0303990 A1* | 10/2016 | Penilla | G06Q 20/18 |
| 2016/0318416 A1* | 11/2016 | Kamatani | B60L 3/0046 |
| 2017/0106753 A1* | 4/2017 | Lee | B60L 3/0046 |
| 2017/0129358 A1* | 5/2017 | Taniguchi | B60L 11/1831 |
| 2017/0259669 A1* | 9/2017 | Eckert | B60L 3/0069 |
| 2017/0328293 A1* | 11/2017 | Yamanaka | F02D 41/20 |
| 2017/0331525 A1* | 11/2017 | Sass | B60L 1/00 |
| 2017/0368951 A1* | 12/2017 | Adlhoch | B60L 53/665 |
| 2018/0134280 A1* | 5/2018 | Takakura | B60K 6/445 |
| 2018/0245492 A1* | 8/2018 | Higa | B60L 50/15 |
| 2018/0274673 A1* | 9/2018 | Sugai | F01N 9/002 |

\* cited by examiner

Example 1. X Capacitor Discharge Circuit

FIG 3
Example 2. Y Capacitor Discharge Circuit

FIG 4

Example 3. Combination x and y Condensator Discharge Circuit

FIG 5

Voltage Profile At Example of x capacitor Discharge Circuit $\tau_1, \tau_2$: Discharge Time Constants $U_{1sec}$: Value Of Voltage To Which $U_x$ Must Have Fallen After 1 Sec.

Figure 2: Voltage Profile Betw. L And PE (Analagous To L1/L2 With Respect To PE)

FIG 8

Figure 1: Simplified Illustration of Entire System

FIG 9

Figure 3: Optionally Switchable Measuring Circuit

CHARGING DEVICE

PRIORITY STATEMENT

The present application hereby claims priority under 35 U.S.C. § 119 to German patent application number DE 102016211387.9 filed Jun. 24, 2016, the entire contents of which are hereby incorporated herein by reference.

FIELD

At least one embodiment of the invention relates to a charging device for charging an at least partially electrically operated vehicle and a method for assisting the discharging of at least one capacitor which is provided in an electrically operated vehicle which is connected to a charging device according to an embodiment of the invention.

BACKGROUND

In the course of the electrification of the drive trains in the automobile industry (completely electronically driven vehicles or hybrid vehicles), more and more so-called onboard chargers (OBC), or chargers which are integrated in the vehicle for the vehicle batteries are being used to charge the accumulator of the vehicle. In these chargers, EMC (electromagnetic compatibility) filters are used to comply with EMC requirements. For this, a customary interference-suppression measure is to use radio-interference-suppression capacitors of the classes x and y (referred to below as x capacitors and y capacitors).

Figure 1:
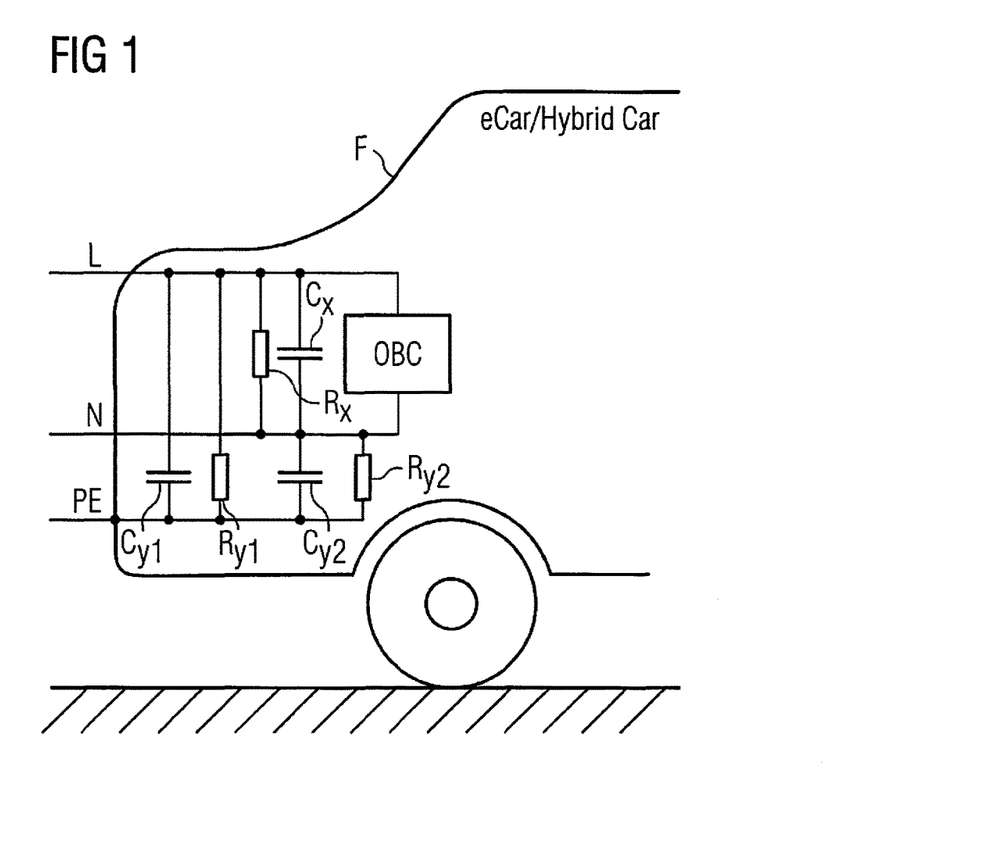
FIG. 1 shows a detail of an electric vehicle having a charging connection and an EMC filter.

This is illustrated figuratively in FIG. 1. A vehicle F having an electric motor or hybrid drive system is provided with a charger OBC for the vehicle batteries. For supplying energy via a charging cable, a charging pillar or a wallbox, terminals are provided for an outer conductor L, a neutral conductor N and a protective conductor PE. In order to suppress interference, x capacitors (Cx in FIG. 1) and y capacitors (Cy1 and Cy2 in FIG. 1) are arranged in the vehicle F. If the supply voltage of the vehicle is disconnected, energy is still stored in these capacitors. Therefore, there is still a residual voltage at the capacitors and therefore at the charging socket of the vehicle. The capacitors must firstly discharge via correspondingly provided resistors (Rx, Ry1, Ry2 in FIG. 1) before there is no longer any voltage at the charging interface of the vehicle F. In order to ensure the protection of the user, the requirement with respect to the rate of decrease in this residual voltage is specified in corresponding product standards (e.g. in the standard DIN EN 61851-1).

Since the discharging resistor Rx is also connected to the supply voltage during normal operation, the discharge resistor Rx also generates a power loss during normal operation, i.e. during the charging process, which power loss reduces the efficiency of the charger OBC. In order to limit these losses to a minimum, attempts are made to select the resistor Rx to be as large as possible. However, this dimensioning is subject to limits owing to the standard requirements with respect to a rapid voltage drop of the residual voltage which is stored in the capacitors. This is because the voltage drop of the voltage which is present at the capacitor Cx approximately obeys an exponential function with the product $Rx*Cx$ as a time constant, i.e.

$$U(t)=Uo*\exp(-t/T), \text{ where } T=Rx*Cx.$$

In order to bring about the voltage drop within the limits specified by the standards, T must not be selected to be too large. In addition to aiming for the largest possible value for the resistor Rx, efforts are frequently made also to select the value for the capacitor Cx to be as large as possible in order to permit a good EMC behavior. The definition of the values for Rx and Cx therefore always constitutes a compromise between the EMC behavior and the power loss or efficiency during normal operation. This compromise usually leads to a situation in which the standard is interpreted as widely as possible or its possibilities utilized as far as possible.

SUMMARY

Embodiments of the invention assist the discharging of vehicle-side capacitors after a charging process.

Advantageous developments are specified in the claims.

Embodiments of the invention also detect defects of a switch arranged in the charging device (EVSE) and are used to switch a charging process.

A charging device and a method are disclosed.

According to an embodiment of the invention, a charging device (e.g. charging cable, charging pillar or wallbox) for charging an at least partially electrically operated vehicle (e.g. electric vehicle, hybrid vehicle) is proposed which comprises at least one electrical component (e.g. ohmic resistor) and a switching device (e.g. opto-triac, relay). In this context, the at least one electrical component and the switching device are arranged in the charging device in such a way that when the charging device is connected to a vehicle a circuit is produced for assisting the discharging (e.g. in the form of partial discharging) of at least one capacitor which is provided on the vehicle side, which capacitor can be opened or closed (e.g. also connected into the circuit as required) via the switching device.

The subject matter of an embodiment of the invention is also directed to a method for assisting the discharging (e.g. for partially discharging) of at least one capacitor which is provided in an electrically operated vehicle which is connected to a charging device according to at least one embodiment of the invention, in which the switching device is opened during a charging process and is closed immediately after the switching process.

BRIEF DESCRIPTION OF THE DRAWINGS

The subject matter of the invention will be explained in more detail below within the scope of example embodiments and with reference to figures. In the drawing.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

According to an embodiment of the invention, a charging device (e.g. charging cable, charging pillar or wallbox) for charging an at least partially electrically operated vehicle (e.g. electric vehicle, hybrid vehicle) is proposed which comprises at least one electrical component (e.g. ohmic resistor) and a switching device (e.g. opto-triac, relay). In this context, the at least one electrical component and the switching device are arranged in the charging device in such a way that when the charging device is connected to a vehicle a circuit is produced for assisting the discharging (e.g. in the form of partial discharging) of at least one capacitor which is provided on the vehicle side, which capacitor can be opened or closed (e.g. also connected into the circuit as required) via the switching device.

According to one development, the charging device comprises a measuring circuit for detecting a defect of at least one switch (e.g. relay) which is arranged in the charging device and is used to switch a charging process. In this context, the at least one electrical component is part of a measuring circuit. The defect can consist in the fact that the at least one switch can no longer be opened after the conclusion of the charging process (e.g. is welded).

In the specified development, the charging device for the charging process can be formed with an outer conductor (also referred to as phase conductor or L conductor). In this context, in particular here and below configurations with a plurality of outer conductors are also included (typically three outer conductors in the case of three-phase current). In this embodiment, the charging device also comprises a neutral conductor (also referred to as a N conductor) and a protective conductor (also referred to as a PE conductor). In order to manufacture the measuring circuit, the outer conductor and the neutral conductor are connected to one another via two resistors which are connected sequentially or in series, and there is the connection of the protective conductor to the section between the two resistors.

A monitoring device for monitoring the flowing current (e.g. current sensor) can be provided in the region of the connection of the protective conductor to the section between the two resistors, the monitoring device being formed e.g. with an optocoupler. According to one development, the monitoring device is configured to monitor the change in the current, and an analysis device (e.g. microcontroller or software which is made available in the charging device or in an external device) is provided, via which analysis device the change behavior of the current can be evaluated in order to assess whether the current is based on a switch defect (and is not attributable e.g. to a residual voltage).

In one embodiment of the charging device according to the invention having a measuring circuit for detecting a defect of at least one switch which is arranged in the charging device and is used to switch a charging process, the measuring circuit is formed with at least one capacitor which can be looped into the connection of the protective conductor to the section between the two resistors. In a first development of this embodiment, the at least one capacitor is arranged serially between two ohmic resistors, and the components of the measuring circuit are dimensioned in such a way that by measuring the voltage drop at the at least one capacitor and/or the ohmic resistor which is arranged on the protective conductor side it is possible to infer whether the at least one switch can no longer be opened after the conclusion of the charging process.

In a second development of this embodiment, an ohmic resistor is connected in series with the at least one capacitor on the protective conductor side, and the components of the measuring circuit are dimensioned in such a way that by measuring the current at the ohmic resistor it is possible to infer whether the at least one switch can no longer be opened after the conclusion of the charging process.

According to one embodiment of the charging device according to the invention, the charging device for the charging process is formed with an outer conductor, a neutral conductor, and a protective conductor. The at least one electrical component and the switching device are arranged in series a) either between the outer conductor (L) and the neutral conductor (N), b) or between the neutral conductor (N) and the protective conductor (PE), c) or between the outer conductor (L) and the protective conductor (PE).

In this context, a combination of the arrangement options a), b) and c) can also be implemented.

The subject matter of an embodiment of the invention is also directed to a method for assisting the discharging (e.g. for partially discharging) of at least one capacitor which is provided in an electrically operated vehicle which is connected to a charging device according to at least one embodiment of the invention, in which the switching device is opened during a charging process and is closed immediately after the switching process.

The following developments of the method relate to a configuration in which the charging device is formed for the charging process with an outer conductor, a neutral conductor and a protective conductor, and in order to produce the measuring circuit, the outer conductor and the neutral conductor are connected to one another via two sequential resistors. In this context, there is a connection of the protective conductor to the section between the two resistors, and a monitoring device for monitoring the current flowing in the region of the connection of the protective conductor to the section between the two resistors is provided in the region. In the form of this development, the method is (also or essentially) a method for detecting a defect of at least one switch which is arranged in the charging device and is used to switch a charging process.

According to one development of the method according to an embodiment of the invention, monitoring of the current flowing in the region of the connection of the protective conductor to the section between the two resistors is carried out in the region. A defect of at least one switch which is arranged in the charging device and is used to switch a charging process is detected, wherein the detection is concluded with the result of freedom from a defect if current no longer flows or the flowing current is below a threshold value.

According to another development of the method according to an embodiment of the invention, monitoring of the current flowing in the region of the connection of the protective conductor to the section between the two resistors is carried out in the region. A defect of at least one switch which is arranged in the charging device and is used to switch a charging process is detected, wherein the detection is concluded with the result of the presence of a defect if current is still flowing or the flowing current is above a threshold value after the expiry of a maximum duration.

According to another development of the method according to an embodiment of the invention, monitoring of the current flowing in the region of the connection of the protective conductor to the section between the two resistors or of the voltage is carried out in the region.

A defect of at least one switch which is arranged in the charging device and is used for switching a charging process is detected, wherein, within the scope of the detection, information about the change in the current or the voltage over time is detected. The detection is concluded with the result of the presence of a defect if a sinusoidal shape of the time profile of the current and/or voltage is inferred from the detected information about the change in the current and/or the voltage over time.

Figure 2:
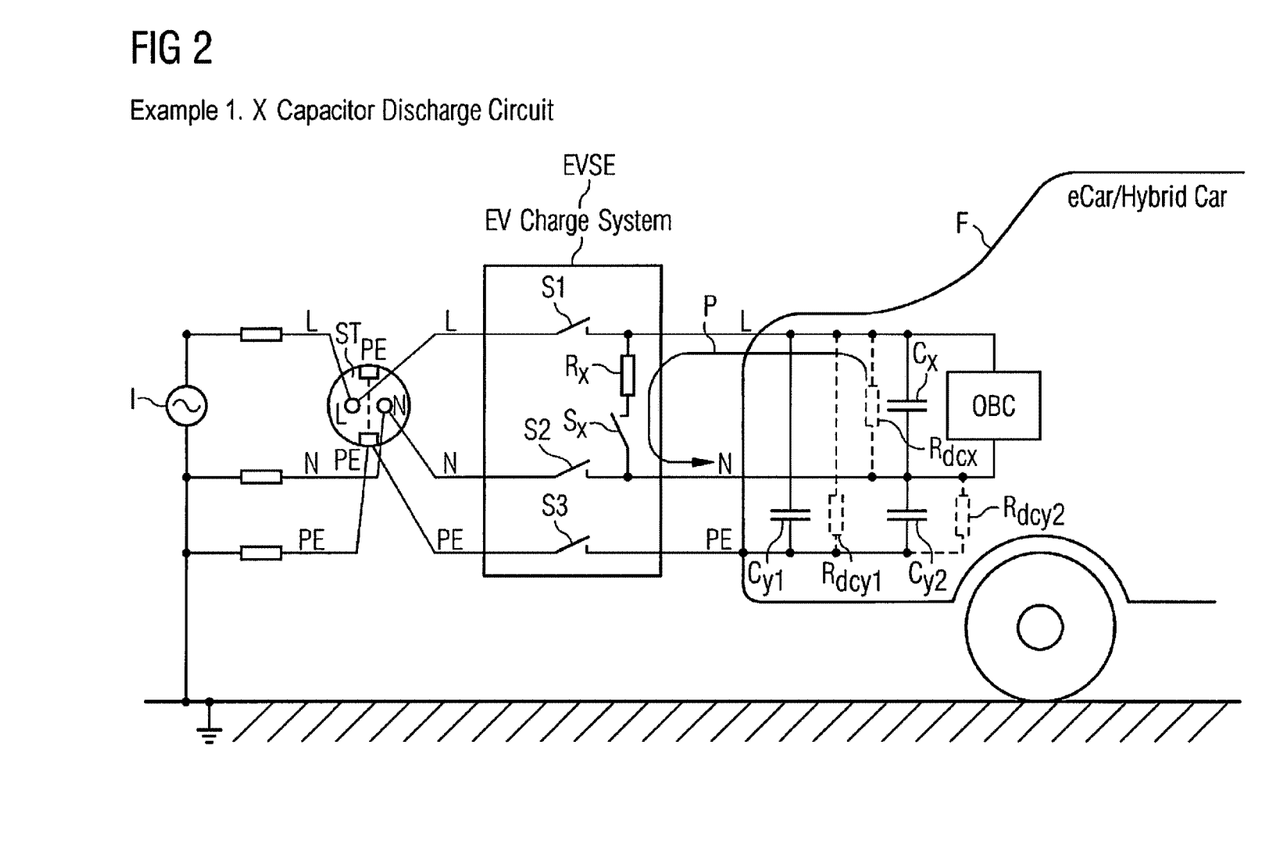
FIG. 2 shows a first example of the relocation of a discharging resistor from the electric vehicle into the charging device.

FIG. 2 shows a detail of an electric vehicle F. This can also be a vehicle with hybrid drive technology. This vehicle F is equipped with a charger OBC for vehicle batteries and an EMC filter. The EMC filter is assigned the capacitors Cx, Cy1 and Cy2. The discharging resistors Rdcx, Rdcy1 and Rdcy2 are intended for discharging the capacitors. The charging connection of the vehicle F is connected to a charging device EVSE (electric vehicle supply equipment) via an outer conductor L, a neutral conductor N and a protective conductor PE. The charging device EVSE has switches S1, S2 and S3 for the conductors L, N and PE. In addition, the charging device is equipped with an interface which permits a connection to a socket ST. Via this socket ST, current can be transmitted from a current source I via the charging device ESVE for charging the vehicle batteries. For the charging process, in this context the switches S1, S2 and S3 are usually closed, and after the conclusion of the charging process they are opened again so that no more current can flow.

FIG. 2 shows a resistor Rx and a switch Sx which are arranged connected in series in the charging device between the outer conductor L and the neutral conductor N. In this context, the resistor Rx and the switch Sx are on the side facing the vehicle F of the charging device EVSE with respect to the switches S1, S2 and S3. During the charging process, the switch Sx is opened, with the result that there is no power loss dropping across the resistor Rx. After the conclusion of the charging process, the switch Sx is closed. In this way, the switch Sx contributes to the discharging of the capacitor Cx. This is indicated in the figure by the arrow P. Since Rx functions as a discharging resistor for the capacitor Cx, the discharging resistor Rdcx (dc=discharge) which is provided for the capacitor Cx in the vehicle F can be dimensioned to be larger or be dispensed with entirely (the former in the case of suitable dimensioning of the resistor Rx). The losses which are caused by the resistor Rx during the charging process are therefore reduced or entirely avoided.

Figure 3:
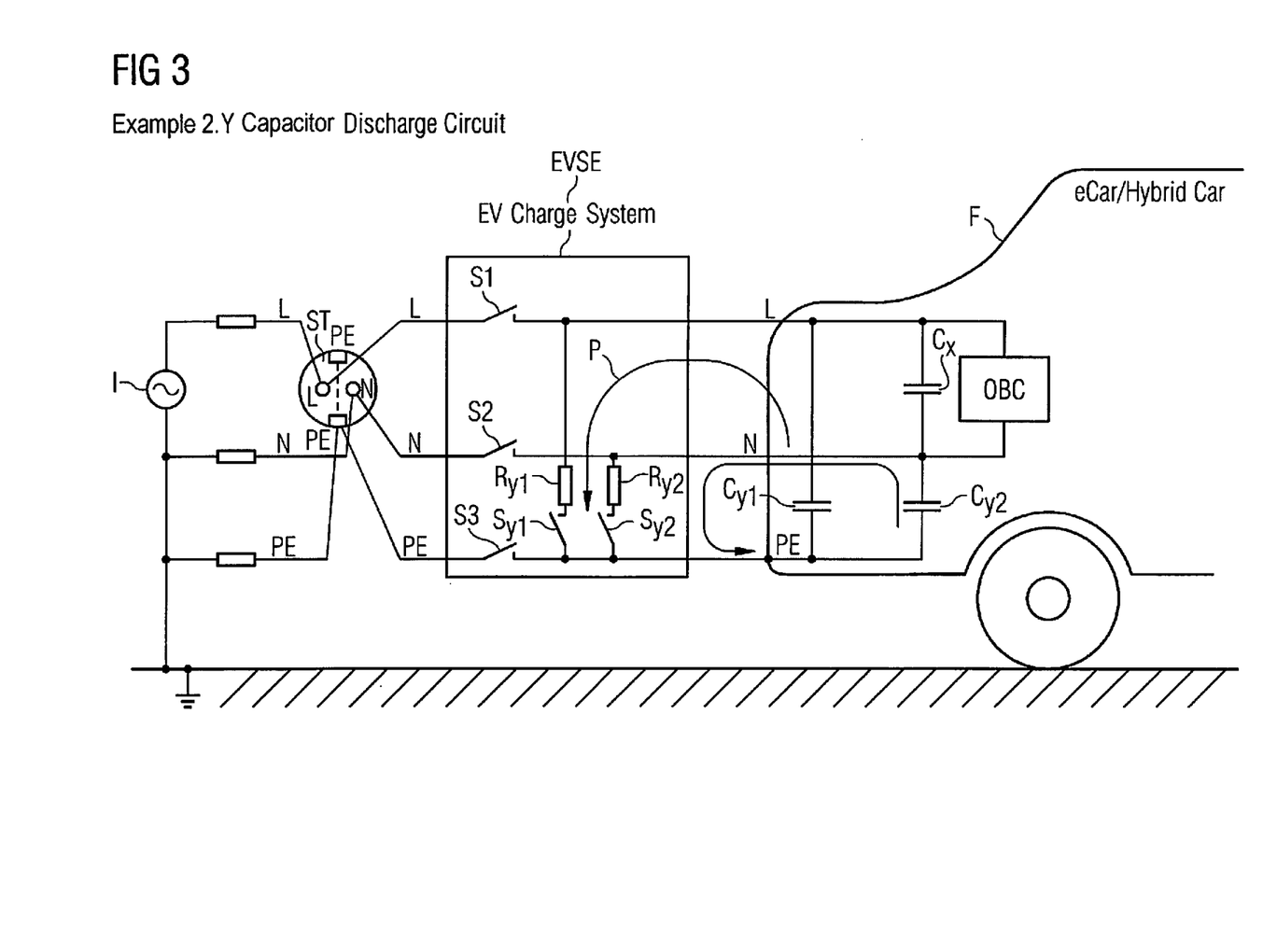
FIG. 3 shows a second example of the relocation of a discharging resistor from the electric vehicle into the charging device.
Figure 4:
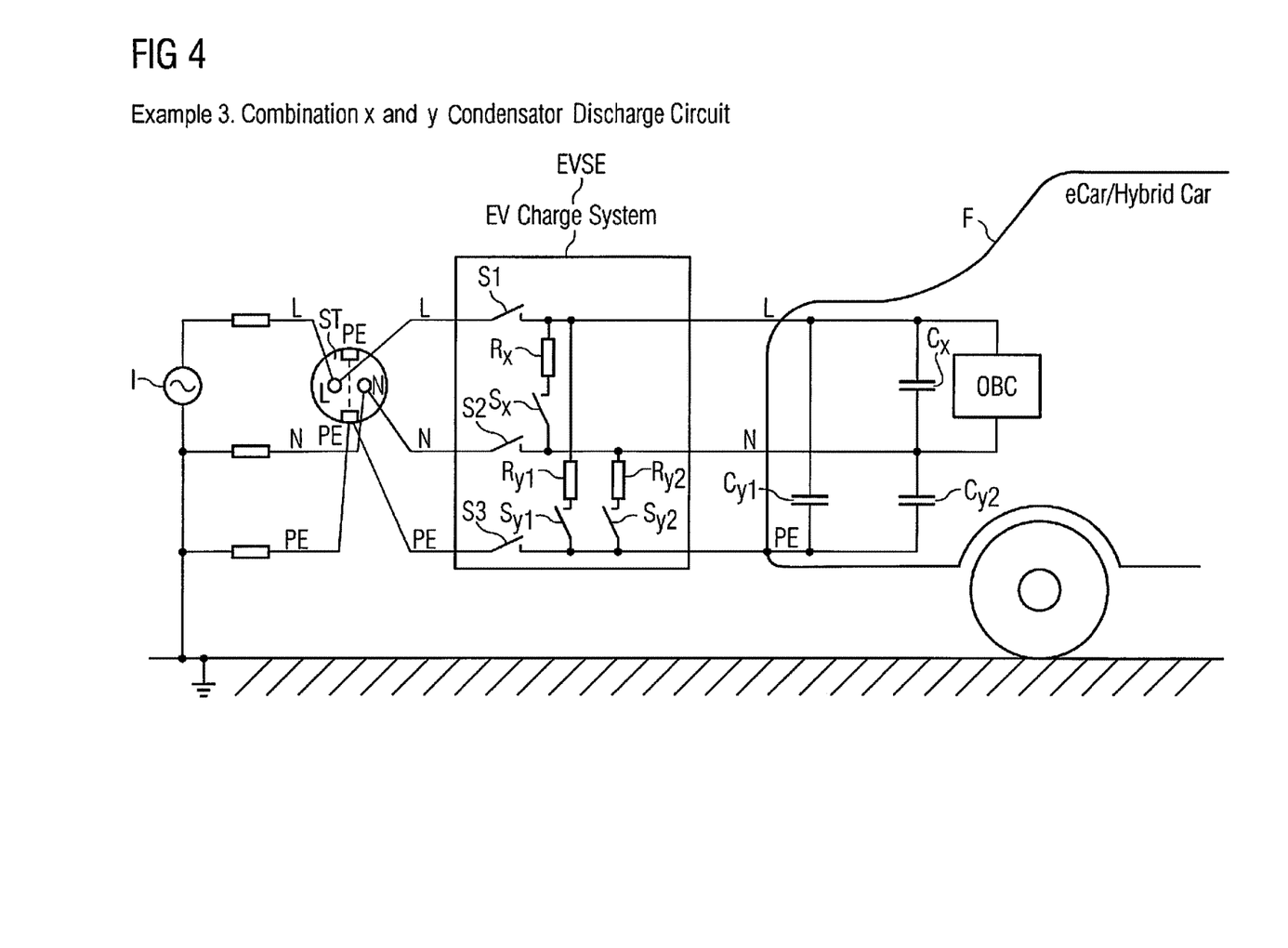
FIG. 4 shows a third example of the relocation of a discharging resistor from the electric vehicle into the charging device.

FIG. 3 shows the arrangement of FIG. 2, wherein here the resistor Ry1 and the switch Sy1 are arranged serially between the outer conductor L and the protective conductor PE, and the resistor Ry2 and the switch Sy2 are arranged serially between the neutral conductor N and the protective conductor PE. These two serial arrangements of the discharging resistor and switches serve to discharge the capacitors Cy1 and Cy2, respectively. In this context, the switches Sy1 and Sy2 are opened again during the charging process and then closed during the discharging phase of the capacitors. The arrangements from FIG. 2 and FIG. 3 can also be combined, which is illustrated in FIG. 4. For the sake of clarity, the resistors Rdcx, Rdcy1 and Rdcy2 which are shown in FIG. 2, and which are optionally present, are not indicated in FIG. 3 and in FIG. 4.

Figure 5:
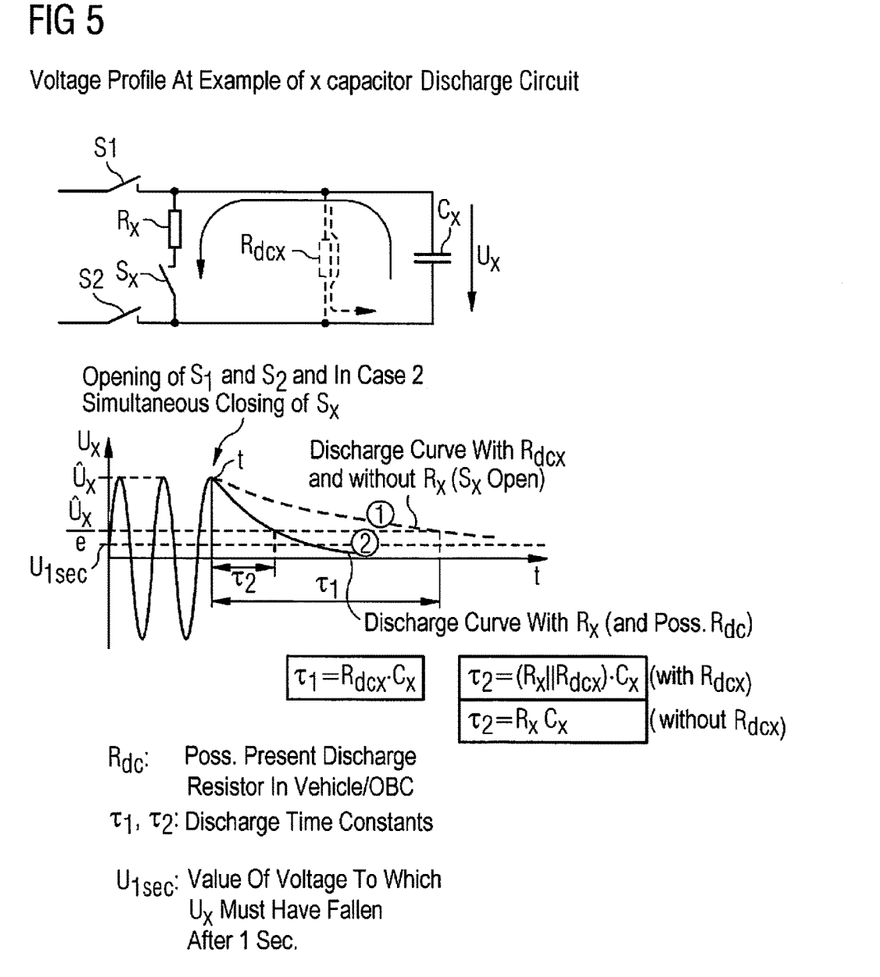
FIG. 5 shows an explanation of the effect of an additional discharging resistor in the charging device.

FIG. 5 shows the configuration from FIG. 2 in a simplified form at the top. The voltage Ux which drops across the capacitor Cx is plotted along the bottom as a function of the time. At the start, the switches S1 and S2 are closed. In contrast, the switch Sx is opened during the charging process. The vehicle is supplied with an alternating voltage during the charging, with the result that the voltage which drops across the capacitor Cx is also in the form of an alternating voltage with the peak value Ûx. At the time t, the charging process is concluded and the switches S1 and S2 are opened. At the same time, the switch Sx is closed, with the result that the capacitor Cx can be discharged via the resistor Rx.

Two cases, specifically the discharge curve 1 without connection of the resistor Rx into the circuit and the discharge curve 2 with connection of the resistor Rx into the circuit are shown at the bottom of FIG. 5. The exponential drop is defined here by the parameter $\tau$ which indicates the time interval after which the voltage has dropped to the value Û/e. The value is conventionally (i.e. without connection of the resistor Rx into the circuit in the first case) equal to $\tau 1 = Rdcx * Cx$. In the second case, the corresponding value is $\tau 2 = Rx * Cx$ if Rdcx was dispensed with entirely, and otherwise $\tau 2 = Rx * Rdcx/(Rx + Rdcx) * Cx$. A more rapid drop is achieved by suitably selecting the value of Rx. Admittedly, the voltage value is also still U1sec, which is to be achieved after one second according to the standard. This can now be achieved with a suitable selection of the value of the resistor Rx without concessions regarding the power loss having to be made.

However, the procedure presented above requires additional components, e.g. the discharge resistors (Rx, Ry1 and Ry2 in FIG. 4) arranged in the charging device ESVE. According to one development of the subject matter of an embodiment of the invention, at least one ohmic resistor which is already present in the charging device but is not required during the charging process is connected into the circuit in order to assist the discharging of the capacitors which are provided on the vehicle side for the EMC filtering.

This at least one ohmic resistor is assigned here to a circuit or to a measuring circuit which is provided for detecting failure to open or welding of a switch provided in the charging device. The switch here is typically a switch for switching a power connection for charging the vehicle and is closed at the start of the charging process and opened again at the conclusion of the charging process. A fault (e.g. welding) which will not permit the switch to open any more would constitute a hazard for the user. Therefore, to a certain extent, standards (e.g. standard IEC 62752 for Mode 2 charging cable or IC-CPD (In Cable Control and Protective Device)) require that a welded relay is detected. The detection of welding is often implemented by a voltage measurement at the relay output.

Figure 6:
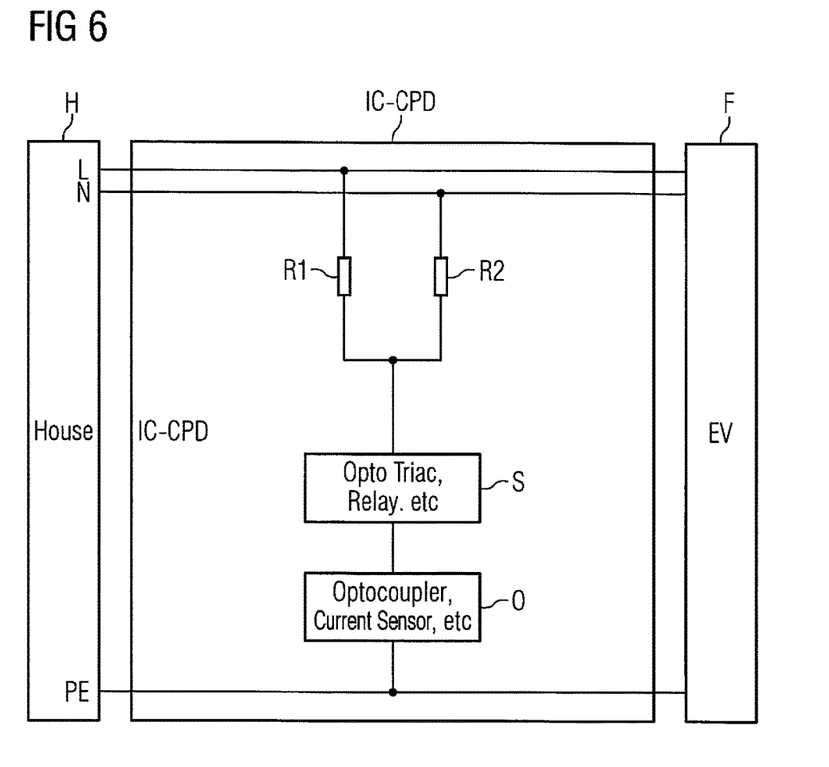
FIG. 6 shows a circuit for detecting the welding of a switch in a charging device.

A measuring circuit for detecting the welding of a switch in a charging device (frequently also referred to by the term "relay welding detection") is shown in FIG. 6. An electric vehicle F is connected via a charging device to a housing H via which the power supply is made available. In order to supply power, a neutral conductor N, a protective conductor PE and an outer conductor L are provided. The charging device comprises an IC-CPD module IC-CPD.

Elements of the measuring circuit for detecting a switch (not shown in FIG. 5—S1, S2, S3 in FIG. 2-FIG. 4) are arranged in this IC-CPD module IC-CPD. In order to detect welding, the outer conductor L and the neutral conductor N are connected to one another via two resistors R1 and R2 which are connected in series.

In addition, a connection of the protective conductor PE to the section between the two resistors R1 and R2 is provided. This connection has a switching device S (e.g. opto-triac or relay) by which an electrical connection to the protective conductor PE can be switched.

In addition, a monitoring device O for monitoring the flowing current (e.g. current sensor) is provided in the region of the connection of the protective conductor to the section between the two resistors R1, R2. This monitoring device O or this current sensor is formed e.g. with an optocoupler.

The voltage measurement which is carried out for the welding detection at the relay output is usually implemented within the scope of the example illustrated in FIG. 6 by converting the voltage into a current and using an optocoupler for the current detection. The optocoupler permits safe disconnection of the wiring of the L, N and PE conductors shown in FIG. 6 from the evaluation electronics for the detection of the current.

Welding detection with the circuit shown in FIG. 5 is typically subject to the following difficulties or disadvantages:

optocouplers are subject to relatively high tolerances, for which reason the welding detection is susceptible to incorrect detections.

For charging devices which are to be capable of being operated at the same time in the UL market (i.e. in countries in which UL standards are binding, e.g. USA) and in the IEC market (where the IEC standards are binding, e.g. European countries), a measurement is necessary which responds at 85 V (usual minimum voltage for devices in the UL market), but not at 60 V. That is to say there are demands placed on the accuracy of the measurement.

Previous approaches for welding detection also do not take into account the possible presence of residual voltages at the EMC filter of the vehicle. Conventional welding detection therefore does not only react to welded contacts but instead in the same form also to residual voltages which arise from the vehicle EMC filter and usually do not constitute a hazard.

For the above reasons, at present a delay is inserted before the welding detection (typically approximately is) and the detection is not started until then.

According to an embodiment of the invention, by connecting the measuring circuit elements for detecting welding into the circuit, the discharging of residual voltages at the EMC filter of the vehicle is speeded up. This is explained with reference to FIG. 6. The switch S connects the components shown into the circuit immediately after the conclusion of the charging process. In this process, the switch S performs a comparable role to the switches Sx, Sy1 and Sy2, and the resistors R1 and R2 perform a comparable role to the resistors Rx, Ry1 and Ry2 in FIG. 2-FIG. 5, i.e. as a result of the connection of the resistors R1 and R2 into the circuit the latter assist the discharging of the vehicle-side capacitors.

As a result of the use of the components for the welding detection for discharging the capacitors in the electric vehicle, the discharging is partially ensured by the IC-CPD and also speeded up by the additional resistors. Instead of the customary waiting time of approximately is, immediate connection into the circuit is thus possible, and this can be faster by an order of magnitude (e.g. 100 ms instead of is).

This can ensure that the residual voltage drops far below the limit from the standard and therefore the welding detection can be significantly simplified.

A further possible way of bringing about improvement is to monitor the current through the optocoupler O before the start of the discharge, and to positively switch off the welding detection as soon as current no longer flows. In contrast, when a defined maximum time for the discharging is exceeded, the welding detection is ended with a negative result.

One development of the subject matter of an embodiment of the invention is based on the different profile of the voltage and current in the case of welding or discharging. This becomes clear from FIG. 7. In the figure, the voltage profiles between the outer conductor L and the protective conductor PE in the case of relay welding (at the top) and residual voltage discharging (at the bottom) in the case of a circuit such as e.g. in FIG. 6 are compared. At the time toff the charging process is ended. If relay welding is present, the sinusoidal voltage UL-PE (at the top) continues to be present. In contrast, the voltage UL-PE drops exponentially after the ending of the charging process if welding is not present but instead residual voltage owing to the vehicle-side capacitors (at the bottom).

Figure 7:
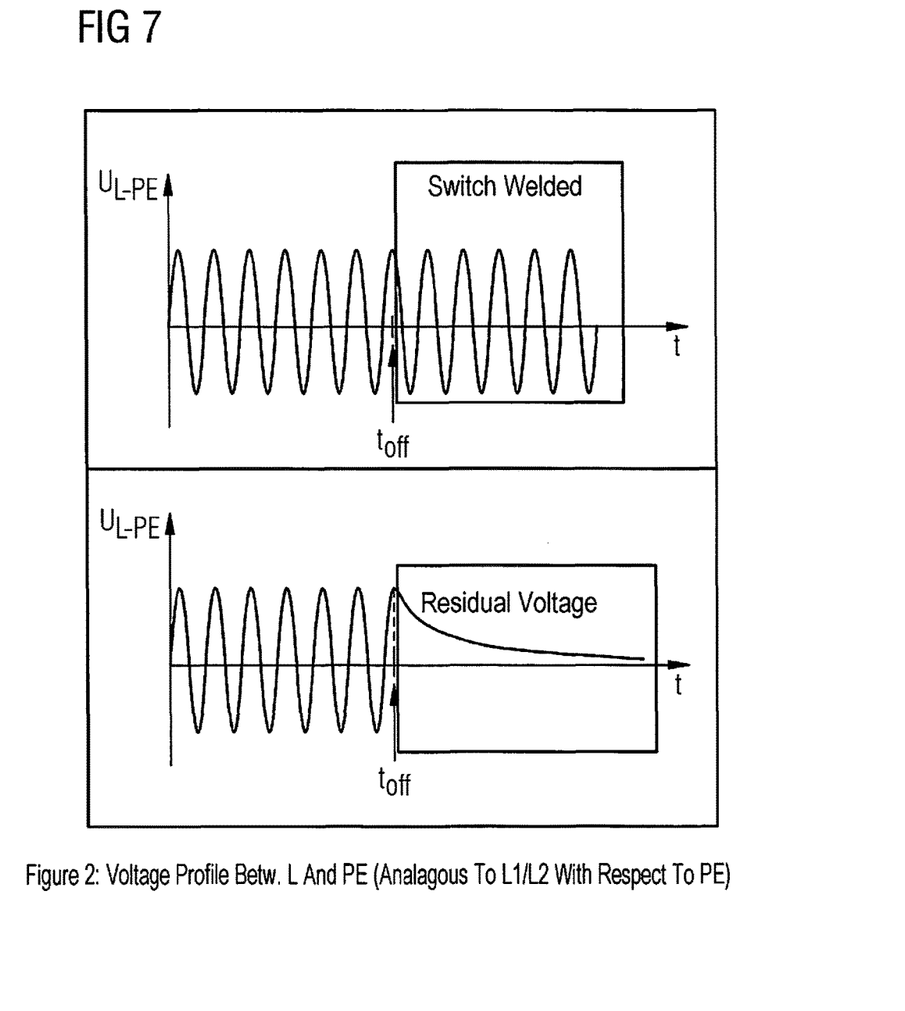
FIG. 7 shows a comparison of the voltage profiles between the outer conductor L and the protective conductor PE in the case of welding of a relay and discharging of a residual voltage.

According to one embodiment of the development, the monitoring of the discharge current is expanded to its shape. In this context, use is made of the fact that the residual voltage, as shown at the bottom of FIG. 7, is a slowly dropping direct voltage. In the case of a welded relay, the sinusoidal alternating voltage (at the top of FIG. 7) is measured. The sinusoidal shape has the result that at the time of the zero crossing there is no voltage, and therefore also no current, passing through the optocoupler O. An evaluation system is made available with software which detects zero crossings and can therefore differentiate between residual voltage and a welded relay. In this way, the welding detection can be started immediately after the end of the charging process.

Another solution, which relates more to circuitry, for differentiating between relay welding and residual voltage discharging is explained in more detail below with reference to FIG. 8.

A socket ST is connected to an electric vehicle F via a charging cable EVSE. The charging process in turn takes place via the external conductor L, neutral conductor N and protective conductor PE. The vehicle F has an EMC filter (illustrated in simplified form) with the capacitors Cx, Cy1 and Cy2 and an on-board charger OBC. In addition, the relay contacts S1, S2 and S3 are indicated.

The electrical components R1, R2, R3, $C_{RVD}$ (RVD=residual voltage detection) and $R_{RWD}$ (RWD=relay welding detection) form the measuring circuit for the welding detection or the residual voltage detection. The resistors R1 and R2 are connected here as in FIG. 6. A "medium potential" is generated via the resistors. The resistor R3, the capacitor $C_{RVD}$ and the resistor $R_{RWD}$ are connected in series between the connection of the two resistors R1 and R2 and the conductor PE. These electrical components permit, given correct dimensioning, a differentiation between welded relays and residual voltages. As a result of the introduction of capacitors into the measuring circuit, the residual voltage can be differentiated from the alternating voltage. A frequency-dependent voltage divider is produced. The impedance of the capacitor $C_{RVD}$ is proportional to 1/f (f=frequency of the voltage signal—cf. FIG. 7).

The capacitor impedance is comparatively low for an alternating voltage with 50 Hz or 60 Hz such as occurs in the measuring circuit when the L contact S1 becomes welded. There is no drop or only a minimal drop in the voltage at the capacitor $C_{RVD}$. The capacitor $C_{RVD}$ constitutes a high impedance for the signal of the residual voltage which changes slowly over time (discharging curve of the capacitors in the vehicle is an e function with a relatively high discharge time constant—cf. FIG. 5). The voltage drop at the capacitor $C_{RVD}$ is large. If the voltage at the capacitor $C_{RVD}$ is measured, the residual voltage at the vehicle can be detected, e.g. when the decrease in charge in the vehicle is unacceptably slow. Significant voltages are therefore measured at the capacitor $C_{RVD}$ only when the voltages have no, or only minimum, changes over time (change in the residual voltage over time>>power system frequency).

The voltage drop at the resistor $R_{RWD}$ is therefore also dependent on the frequency even though the component has frequency-independent impedance (ohmic resistance). Since the voltage in the measuring branch is, however, divided up in accordance with the voltage divider principle and the impedance of the capacitor $C_{RVD}$ depends to a large extent on the frequency, the voltage drop at the resistor $R_{RWD}$ behaves in a precisely inverted fashion with respect to the voltage drop of the capacitor $C_{RVD}$. This is compiled in the following table:

|  | Voltage at $C_{RVD}$ | Voltage at $R_{RWD}$ |
| --- | --- | --- |
| Relay contact welded | zero or very low | high |
| Residual voltage present | high | zero or very low |

In this context, a residual voltage can also be a fault state if the energy from capacitors in the vehicle is not reduced within limits predefined in standards, e.g. a drop of the voltage at the vehicle socket to below 42.4 VAC/60 VDC within 1 second.

Figure 8:
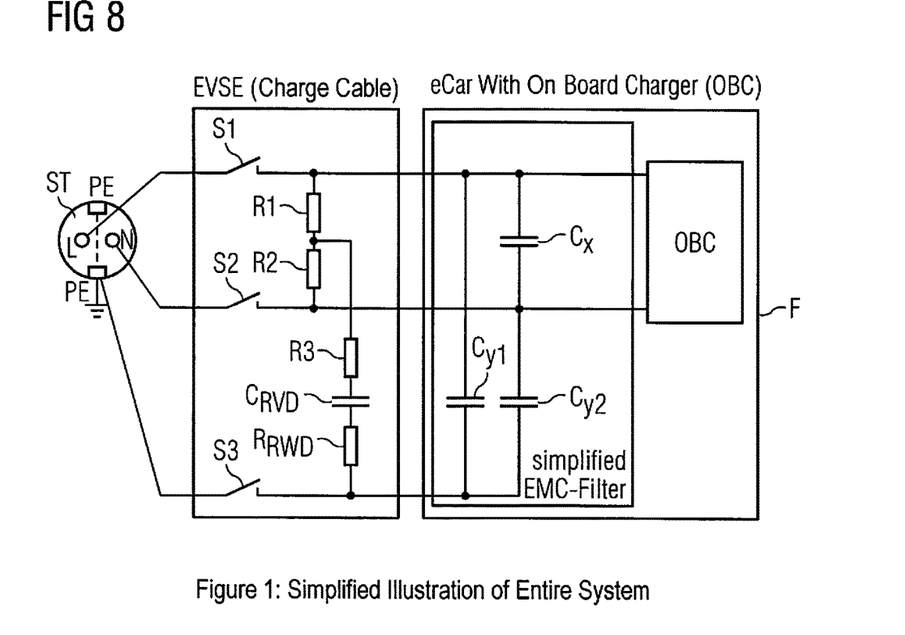
FIG. 8 shows a circuit for differentiating welding of a relay and discharging of a residual voltage.

If a detection of residual voltages is not desired or required, an adapted circuit according to FIG. 8 (resistor R3 can be dispensed with) can be used for the welding detection, in which circuit the current in the measuring branch is measured against the protective conductor PE. Given correct dimensioning of the components R1, R2, $C_{RVD}$ and $R_{RWD}$ this circuit is nevertheless not sensitive to residual voltages because the capacitor limits the flow of current to minimum values (e.g. a few nA) in the case of a residual voltage. In contrast, in the case of a welded relay the capacitor impedance of the capacitor $C_{RVD}$ is significantly lower, with the result that the flow of current is limited but nevertheless measurable.

Figure 9:
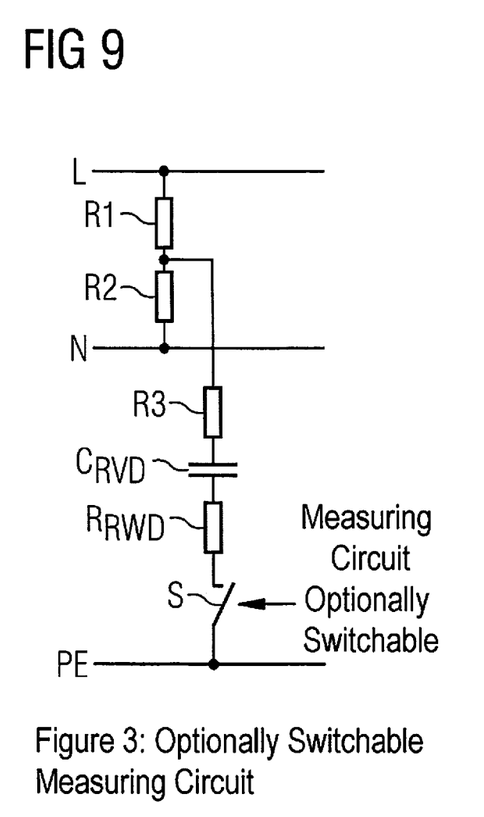
FIG. 9 shows the circuit from FIG. 8 with a switch for connecting into the circuit as required.

As shown in FIG. 9, the measuring circuit which is explained on the basis of FIG. 8 can be made switchable (switch S), in order to control the measuring time precisely and as a result limit chronologically the leakage current generated by the measuring circuit (the leakage current only during a few 100 ms during which measurement is carried out).

The described inventive subject matters can be applied both for Mode 2 charging cables and for charging pillars and wallboxes. Furthermore, the method can be used for single-phase and multiphase systems both within the scope of IEC standards and UL standards.

A main advantage is the simplification and the relatively high resistance to incorrect triggering of the welding detection. Further advantages are the option of replacing the discharging resistors in the OBC by those in the IC-CPD module. The EMC behavior can be improved and the efficiency increased (by reducing the power loss). In this way, a cost reduction in the OBC (on-board charger) is potentially achieved by using more cost-effective components and reducing the installation space in the OBC by using relatively small components or relocating the discharging resistors into the charging device EVSE. An improved EMC behavior of the OBC by using relatively large x capacitors and speeding up the discharging process is also possible by using relatively low values of discharging resistors. The improvements mentioned above can also be used in combination.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A charging device for charging an at least partially electrically operated vehicle, the charging device comprising:
at least one electrical component;
a switching device, the at least one electrical component and the switching device being arranged in the charging device such that upon the charging device being connected to a vehicle, a circuit is produced for assisting discharging of at least one capacitor provided on a side of the at least partially electrically operated vehicle, the at least one capacitor being openable or closable via the switching device; and
a measuring circuit to detect a defect of at least one switch, arranged in the charging device and usable to switch a charging process, wherein the at least one electrical component is part of the measuring circuit.

2. The charging device of claim 1, wherein the at least one electrical component is an ohmic resistor.

3. The charging device of claim 1, wherein the defect resides in the at least one switch being no longer openable after conclusion of the charging process.

4. The charging device of claim 1, wherein
the charging device for the charging process includes
an outer conductor;
a neutral conductor; and
a protective conductor, and
wherein to produce the measuring circuit
the outer conductor and the neutral conductor are connected to one another via two sequential resistors, and
the protective conductor is connected to a section between the two sequential resistors.

5. The charging device of claim 4, wherein
a monitoring device to monitor current is provided in a region of connection of the protective conductor to the section between the two sequential resistors.

6. The charging device of claim 5, wherein the monitoring device is formed with an optocoupler.

7. The charging device of claim 5, wherein
the monitoring device is configured to monitor a change in the current, and
an analysis device is provided, to evaluate change in behavior of the current, to assess whether the current is based on a switch defect.

8. The charging device of claim 1, wherein the measuring circuit includes at least one capacitor.

9. The charging device of claim 4, wherein
the measuring circuit includes at least one capacitor, and
the at least one capacitor is looped into the connection of the protective conductor to the section between the two sequential resistors.

10. The charging device of claim 9, wherein
the at least one capacitor is arranged serially between two ohmic resistors, and
components of the measuring circuit are dimensioned such that, by measuring a voltage drop at at least one of the at least one capacitor and the ohmic resistor arranged on a protective conductor side, inference, as to whether the at least one switch can no longer be opened after conclusion of the charging process, is possible.

11. The charging device of claim 9, wherein
an ohmic resistor is connected in series with the at least one capacitor on a protective conductor side, and
the components of the measuring circuit are dimensioned such that, by measuring current at the ohmic resistor, inference, as to whether the at least one switch can no longer be opened after conclusion of the charging process, is possible.

12. The charging device of claim 1, wherein
the charging device for the charging process includes
an outer conductor,
a neutral conductor, and
a protective conductor, and
the at least one electrical component and the switching device being arranged in series
a) either between the outer conductor and the neutral conductor,
b) or between the neutral conductor and the protective conductor, c) or between the outer conductor and the protective conductor.

13. The charging device of claim 12, comprising
a multiplicity of series arrangements, each formed with at least one electrical component and a switching device, wherein the multiplicity of series arrangements each include one of arrangement options a), b) and c).

14. The charging device of claim 1, wherein the charging device is a charging cable, a charging pillar or a wallbox.

15. A method for assisting discharging of at least one capacitor provided in an electrically operated vehicle connected to a charging device, the charging device including at least one electrical component and a switching device, the at least one electrical component and the switching device being arranged in the charging device such that upon the charging device being connected to a vehicle, a circuit is produced for assisting discharging of at least one capacitor provided on a side of the vehicle, the at least one capacitor being openable or closable via the switching device; a measuring circuit to detect a defect of at least one switch, arranged in the charging device and usable to switch a charging process, wherein the at least one electrical component is part of the measuring circuit; a monitoring device is provided in a region of connection of the protective conductor to the section between the two sequential resistors; an outer conductor; a neutral conductor; and a protective conductor, wherein to produce the measuring circuit the outer conductor and the neutral conductor are connected to one another via two sequential resistors, and the protective conductor is connected to a section between the two sequential resistor, the method comprising:
monitoring current in the region of the connection of the protective conductor to the section between the two sequential resistors;
detecting a defect of at least one switch, arranged in the charging device and usable to switch a charging process; and
concluding the detection with a result of freedom from defects upon the current no longer flowing or upon the current being below a threshold value.

16. The method of claim 15, further comprising:
monitoring the current in the region of the connection of the protective conductor to the section between the two sequential resistors;
detecting a defect of at least one switch, arranged in the charging device and usable to switch a charging process; and
concluding the detection with a result of a presence of a defect upon current still flowing or upon the current being above a threshold value after expiration of a maximum duration.

17. The method of claim 15, further comprising:
monitoring of the current or of a voltage in the region of the connection of the protective conductor to the section between the two sequential resistors;
detecting a defect of at least one switch, arranged in the charging device and used for switching a charging process, wherein, within a scope of the detection, information about a change in the current or the voltage over time is detected; and
concluding the detection with a result of a presence of a defect upon at least one of a time profile of the current being in a sinusoidal shape and a voltage being inferred from the information detected about a change in at least one of the current and the voltage over time.

18. The charging device of claim 6, wherein
the monitoring device is configured to monitor a change in the current, and
an analysis device is provided, to evaluate change in behavior of the current, to assess whether the current is based on a switch defect.

19. The charging device of claim 3, wherein
the charging device for the charging process includes
an outer conductor;
a neutral conductor; and
a protective conductor, and
wherein to produce the measuring circuit
the outer conductor and the neutral conductor are connected to one another via two sequential resistors, and
the protective conductor is connected to a section between the two sequential resistors.

20. The charging device of claim 19, wherein
a monitoring device to monitor current is provided in a region of the connection of the protective conductor to the section between the two sequential resistors.

21. The charging device of claim 20, wherein the monitoring device is formed with an optocoupler.

22. The charging device of claim 20, wherein
the monitoring device is configured to monitor a change in the current, and
an analysis device is provided, to evaluate change in behavior of the current, to assess whether the current is based on a switch defect.

* * * * *